United States Patent Office 2,760,291
Patented Aug. 28, 1956

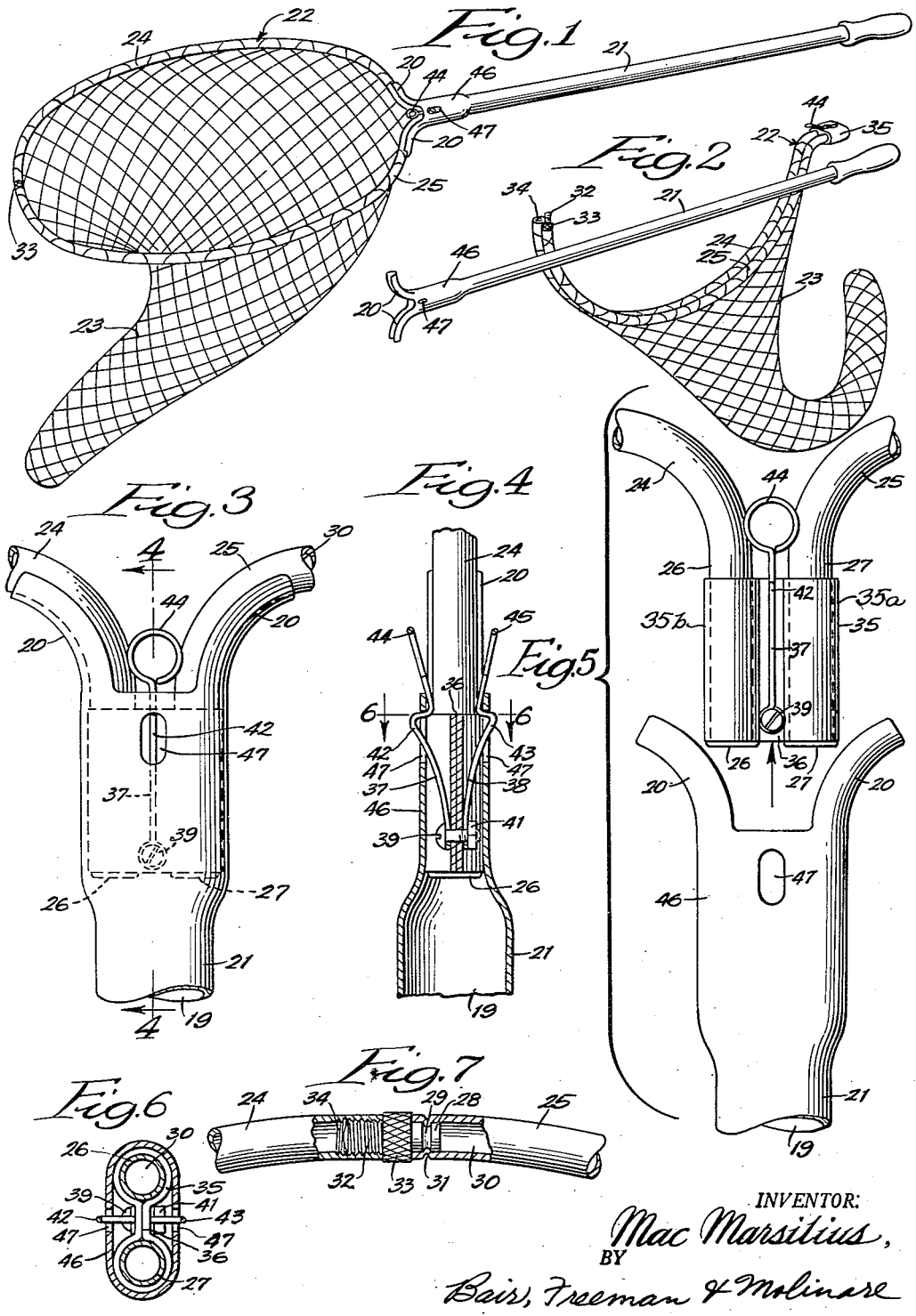

2,760,291

FISH LANDING NETS

Mac Marsilius, Woodstock, Ill., assignor to Woodstock Metal Products, Inc., Woodstock, Ill., a corporation of Illinois Application November 22, 1952, Serial No. 322,053

4 Claims. (Cl. 43—12)

This invention relates to fish landing nets and particularly to fish landing nets which may be collapsed for shipping or storage.

It is an object of the invention to provide fish landing nets which are formed mainly of light tubular material.

It is also an object of the invention to provide fish landing nets which may be readily collapsed for storage and shipping, but which are absolutely rigid and secure when in assembled position.

It is an additional object of the invention to provide improved connections for the hoop of the net and the handle thereof.

It is also an object of the invention to provide an improved connection for the hoop of a net which is split at one end and connected together by said connection opposite the split end.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of a fish landing net constructed in accordance with the first embodiment of the invention;

Figure 2 is a perspective view of the hoop and handle in the collapsed position;

Figure 3 is a partial elevational view of the connection between the hoop and the handle;

Figure 4 is a sectional view taken on line 4—4 of Figure 3;

Figure 5 is an exploded elevational view of the parts shown in Figure 3;

Figure 6 is a sectional view taken on line 6—6 of Figure 4; and

Figure 7 is an enlarged partial sectional view of the connection for the ends of the hoop.

Referring specifically to Figures 1–7, inclusive, of the drawings for a detailed description of the first embodiment of the invention, numeral 21 designates generally the handle or shaft of the fishing net which is preferably formed of hollow tubular metal as shown at 19, which metal may, for example, be aluminum. Diverging half circular projections 20 extend from one end of the handle and are preferably integral therewith.

A two-piece hoop is indicated generally at 22 and supports a fish landing net 23. The hoop 22 is formed of two pieces 24 and 25, which are also formed of hollow aluminum. The hoop portions 24 and 25 are bent to provide parallel adjacent leg portions 26 and 27 at the ends thereof, as best shown in Figure 5.

The two hoop portions 24 and 25 are connected at the opposite end by means of a pin 28 having a groove 29 at one end thereof. The pin 28 is secured to the hoop portion 25 by means of an indentation 31 which grips the groove 29. The other end of the pin 28 is threaded as shown at 32 and a collar 33 is secured to the pin 28 in order to rotate it. Threads 34 are provided internally of the hoop portion 24 and are engaged by the threads 32 on the pin 28, as the pin 28 is rotated. It is obvious that the pin 28 may be threaded into or detached from the hoop portion 24 when it is desired to assemble the device.

The parallel ends 26 and 27 of the hoop are rotatably retained in a sheet metal member 35 comprising collars 35a and 35b which encompasses the said ends and which is flattened between those ends at 36 as best shown in Figure 6 to form a connector therebetween. The resilient spring members 37 and 38 are secured to the flattened portion 36 by a screw 39 and a nut 41. The resilient members 37 and 38 include outwardly bent portions 42 and 43, respectively, and also include rounded portions 44 and 45, which are depressed by the fingers of the user in order to dissamble the net, as will be apparent hereinafter.

The handle 21 is flattened as shown at 46 adjacent the extensions 20. An elliptical slot 47 is formed in the flattened portion 46 and extends completely therethrough.

The disassembled net is shown in Figure 2. In order to assemble the net it is only necessary to rotate the hoop portions 24 and 25 to a position where they can be secured together at one end by the pin 28. The other end is then inserted into the hollow flattened portion 46 of the handle 21 and during such insertion the resilient members 37 and 38 will be depressed inwardly until the outwardly turned portions 42 and 43 enter the slot 47, whereupon the resilient members 42 and 43 will spring outwardly and the bent portions 42 and 43 engage the upper edges of the slot 47. Obviously, the hoop 22 and handle 21 are securely fastened together and cannot be accidentally separated. In order to separate the hoop 22 from the handle 21 it is only necessary to depress the portions 44 and 45 of the resilient members 37 and 38 so that the bent portions 42 and 43 thereof will clear the upper edges of the slot 47.

From the foregoing, it is apparent that I have provided an improved collapsible fish landing net which is inexpensive and simple in construction and which may be readily disassembled for packing, shipping or storage.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A fish landing net comprising a handle and a split hoop for a net, having a pair of ends, the ends of the split hoop terminating in spaced legs, one end of said handle being formed to provide a hollow space to receive said legs, resilient means cooperating with said one end of the handle and with said legs to detachably secure the hoop to the handle, a collar encompassing each of said legs, a connector between said collars, said resilient means including an outwardly extending portion, and means for connecting said resilient means to said connector, the material forming the hollow portion of the handle having an opening therein into which said outwardly extending portion of the spring extends when the hoop and handle are assembled to lock the same together.

2. A fish landing net comprising a handle and a split hoop for a net, having a pair of ends, the ends of the split hoop terminating in spaced legs, one end of said handle being formed to provide a hollow space to receive said legs, resilient means cooperating with said one end of the handle and with said legs to detachably secure the hoop to the handle, a collar encompassing each of said legs, a connector between said collars, said resilient means comprising a pair of springs each having an outwardly extending portion, and means for connecting the said springs to opposite sides of said connector, the opposite sides of the material forming said hollow portion of the handle having openings therein into which said outwardly extending portions of the springs extend when the hoop and handle are assembled to lock the same together.

3. A fish landing net comprising a handle and a hoop for a net, said hoop being formed in two substantially half circular portions, means for detachably securing said half circular portions together at one of the ends thereof, the other ends of the half circular portions terminating in spaced legs, one end of said handle being formed to provide a hollow space to receive said legs, and resilient means cooperating with said one end of the handle and with said legs to detachably secure the hoop to the handle, a collar encompassing each of said legs, a connector between said collars, said resilient means including an outwardly extending portion, and means for connecting said resilient means to said connector, the material forming the hollow portion of the handle having an opening therein into which said outwardly extending portion of the spring extends when the hoop and handle are assembled to lock the same together.

4. A fish landing net comprising a handle and a hoop for a net, said hoop being formed in two substantially half circular portions, means for detachably securing said half circular portions together at one of the ends thereof, the other ends of the half circular portions terminating in spaced legs, one end of said handle being formed to provide a hollow space to receive said legs, resilient means cooperating with said one end of the handle and with said legs to detachably secure the hoop to the handle, a collar encompassing each of said legs, a connector between said collars, said resilient means comprising a pair of springs each having an outwardly extending portion, and means for connecting said springs to opposite sides of said connector, the opposite sides of the material forming said hollow portion of the handle having openings therein into which said outwardly extending portions of the springs extend when the hoop and handle are assembled to lock the same together.

References Cited in the file of this patent

UNITED STATES PATENTS

| | | |
|---|---|---|
| 213,919 | McGinnis | Apr. 1, 1879 |
| 273,651 | Welles | Mar. 6, 1883 |
| 1,668,835 | Allen | May 8, 1928 |
| 2,472,572 | Dailey | June 7, 1949 |
| 2,482,718 | Oathout | Sept. 20, 1949 |
| 2,583,987 | Baisor | Jan. 29, 1952 |

FOREIGN PATENTS

| | | |
|---|---|---|
| 404,653 | France | Dec. 8, 1909 |